(12) United States Patent
Kuo et al.

(10) Patent No.: US 12,664,665 B2
(45) Date of Patent: Jun. 23, 2026

(54) METHOD FOR MOTION DETECTION AND CIRCUIT SYSTEM

(71) Applicant: REALTEK SEMICONDUCTOR CORP., Hsinchu (TW)

(72) Inventors: Jyun-Yi Kuo, Hsinchu (TW); Chun-Hsien Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 391 days.

(21) Appl. No.: 18/319,497

(22) Filed: May 18, 2023

(65) Prior Publication Data

US 2023/0377170 A1 Nov. 23, 2023

(30) Foreign Application Priority Data

May 20, 2022 (TW) .................................. 111118794

(51) Int. Cl.
| | |
|---|---|
| *G06T 7/20* | (2017.01) |
| *G06T 7/11* | (2017.01) |
| *G06T 7/254* | (2017.01) |
| *G06V 10/25* | (2022.01) |
| *G06V 10/60* | (2022.01) |

(52) U.S. Cl.
CPC .................. *G06T 7/20* (2013.01); *G06T 7/11* (2017.01); *G06V 10/25* (2022.01); *G06V 10/60* (2022.01); *G06T 2207/20084* (2013.01); *G06T 2207/20132* (2013.01); *G06T 2207/30196* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 8,000,498 B2 * | 8/2011 | Shih ........................ | G06T 7/254 |
| | | | 382/209 |
| 8,447,069 B2 | 5/2013 | Huang et al. | |

(Continued)

FOREIGN PATENT DOCUMENTS

| | | | |
|---|---|---|---|
| CN | 113259588 A | | 8/2021 |
| JP | 2011128695 A | * | 6/2011 |

(Continued)

*Primary Examiner* — Amandeep Saini
*Assistant Examiner* — Caroline Tabancay Duffy
(74) *Attorney, Agent, or Firm* — Li & Cai Intellectual Property (USA) Office

(57) ABSTRACT

A method for motion detection and a circuit system are provided. In the method, when any moving object within a scene is sensed, continuous frame images are obtained. Each of the frame images is divided into multiple regions. Brightness and chromaticity of each region are calculated frame by frame, and are compared with a background model to obtain a difference. Accordingly, a movement event in each of the frame images can be identified. When any movement event is recognized, a region of interest (ROI) covering one or more of the regions where the movement event is detected is established. An intelligent model created by a neural network algorithm is used to calculate a trust score for a possibility of having the moving object in each of the frame images. The moving object can be detected by comparing the trust score with a determination threshold.

17 Claims, 7 Drawing Sheets

(56) References Cited

U.S. PATENT DOCUMENTS

| | | | |
|---|---|---|---|
| 10,679,046 B1 * | 6/2020 | Black | G06V 40/23 |
| 11,200,681 B2 | 12/2021 | Chan et al. | |
| 2005/0134745 A1 * | 6/2005 | Bacche | H04N 9/78 |
| | | | 348/E5.065 |
| 2009/0310955 A1 * | 12/2009 | Lien | G03B 17/00 |
| | | | 396/257 |
| 2011/0228092 A1 * | 9/2011 | Park | H04N 19/157 |
| | | | 348/154 |
| 2016/0198118 A1 * | 7/2016 | Kang | G09G 3/20 |
| | | | 348/700 |
| 2018/0157939 A1 * | 6/2018 | Butt | H04N 21/44008 |
| 2019/0362501 A1 * | 11/2019 | Makino | G06T 7/215 |
| 2021/0407262 A1 * | 12/2021 | Farneman | G08B 13/19619 |
| 2022/0180529 A1 * | 6/2022 | Muta | G06V 20/53 |

FOREIGN PATENT DOCUMENTS

| | | | |
|---|---|---|---|
| TW | 201120807 A1 | 6/2011 | |
| TW | 202111662 A | 3/2021 | |

* cited by examiner

500

METHOD FOR MOTION DETECTION AND CIRCUIT SYSTEM

CROSS-REFERENCE TO RELATED PATENT APPLICATION

This application claims the benefit of priority to Taiwan Patent Application No. 111118794, filed on May 20, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motion detection technology, and more particularly to a method and a circuit system that perform motion detection by using a neural network technology after a background model is established for detecting a movement event.

BACKGROUND OF THE DISCLOSURE

A conventional method of identifying a moving object includes using an infrared sensor that adopts a light-blocking principle to perform motion detection. Further, an image-recognition technology can also be used to achieve motion detection by analyzing changes of images, lights and shadows in a space.

In the conventional image-recognition technology that relies on the changes of images to achieve motion detection, a background model that represents unchanging images in an environment is established in advance. In a monitoring process, continuous images in the environment are recorded. A powerful image-processing circuit is required to compare the images with the background model frame by frame. The changes of the continuous frames can be obtained, so as to identify the moving object.

When no movement event is detected in the image for an uninterrupted period, but a specific object (e.g., a person who usually does not remain still for a long period of time) in the image needs to be recognized, a notification can be triggered if any person in the image is recognized by a human shape recognition method. However, when the human-shaped object is, e.g., a cardboard cutout of a person, this may continuously trigger erroneous notifications. Therefore, a more effective and accurate recognition technology is needed to avoid the problem of erroneous detection.

Conventionally, a neural network technology is implanted into the image-processing circuit, so that the relevant image-processing circuit can determine the moving object in the environment more intelligently through a neural network algorithm. Further, through the neural network technology, the image-processing circuit can determine subsequent actions by detecting changes of the image.

In the conventional technology, when the neural network algorithm is used to identify objects in the image, the objects can be effectively identified only if the size of the image to be inputted is consistent with that required by a model in the neural network algorithm. For example, since the model requires a 1:1 ratio image, the image inputted to the model needs to be resized if a ratio of the image captured by a camera is 16:9. However, the image may be distorted in a process of image conversion, and the distorted image may result in a lower recognition rate.

Further, since the object to be recognized in the image may move or rotate, it is difficult to guarantee that every posture of the object can be accurately recognized by the model that is established through the neural network algorithm. Therefore, a trust score for evaluating the object recognition may fluctuate. If a fixed trust score threshold is applied, tracking the moving object in the continuous frames can be difficult.

As mentioned above, the neural network algorithm can be used to recognize the objects in the image effectively, but the conventional neural network technology still faces certain difficulties. A neural network computation requires a huge amount of computing resources, such that a micro-controller of a sensing device that uses a battery as its power source suffers serious power consumption problems.

SUMMARY OF THE DISCLOSURE

In order to effectively filter out data that may result in misjudgment and enhance a recognition rate for a specific object, the present disclosure provides a method for motion detection and a circuit system. A neural network technology is particularly used for recognizing a moving object in images. A threshold used in the method can be dynamically adjusted, so as to recognize the moving object and keep track of the moving object more accurately.

According to one embodiment of the method for motion detection, the method is operated in a circuit system, and a camera is first used to capture continuous frame images of a scene. For identifying a movement event in the frame images, each of the frame images is divided into multiple regions, and brightness and chromaticity of each of the regions can be calculated frame by frame. The brightness and the chromaticity of each of the regions are compared with brightness and chromaticity of a background model for obtaining a difference there-between. This difference is referred to for determining if any movement event can be identified.

When the movement event is identified in the frame image, one or more of the regions having the movement event can be used to establish a region of interest (ROI). Afterwards, the circuit system detects if the moving object is present in the ROI. If the moving object is detected in the ROI, the ROI can be updated according to the position and image features of the moving object, so as to detect the moving object based on the updated ROI in the subsequent frame images. If no moving object is detected, records of the ROI stored in a memory can be deleted.

In one embodiment of the present disclosure, the circuit system is implemented by an integrated circuit. The circuit system includes a computation circuit. An electronic system having the circuit system senses the movement event in the scene by using a motion sensor. A camera of the electronic system is then activated to capture the continuous frame images of the scene. When the movement event is identified, the computation circuit of the circuit system is activated to perform a process of detecting the moving object in each of the frame images.

Furthermore, the moving object is a human-shaped moving object. The computation circuit operates a neural network algorithm for inferencing a human shape recognition model. When any human-shaped moving object is detected in the region of interest, the human shape recognition model is used to calculate a trust score for a probability of having the human-shaped moving object in each of the frame images. The trust score is compared with a determination threshold in order to confirm the human-shaped moving object.

Preferably, the determination threshold is lowered when the human-shaped moving object is detected, so as to prevent images that are to contain the human-shaped moving object from being filtered out due to a high threshold.

Further, in the step of identifying the movement event in each of the frame images in a frame-by-frame manner, the frame image is divided into the multiple regions, and the image features such as the brightness and the chromaticity of each of the regions can be obtained. The background model can be established according to the values of brightness and chromaticity of before and after frame images. After that, a difference between the values of brightness and chromaticity of each of the regions and the background model can be frame-by-frame calculated and compared with a threshold so as to confirm the movement event.

Preferably, the background model can be expressed by the values of chromaticity and brightness. The background model can also be updated. For example, a ratio of the values of chromaticity and brightness of a current frame image and the values of chromaticity and brightness of the background model is calculated for updating the background model.

Furthermore, in the step of initializing the background model, whether or not an auto exposure value of each of the frame images is stable should be determined. If the auto exposure value is unstable, the frame images with the stable auto exposure values are further required. If the auto exposure value is stable, the background model is initialized according to the value of chromaticity and brightness of each of the frame images.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
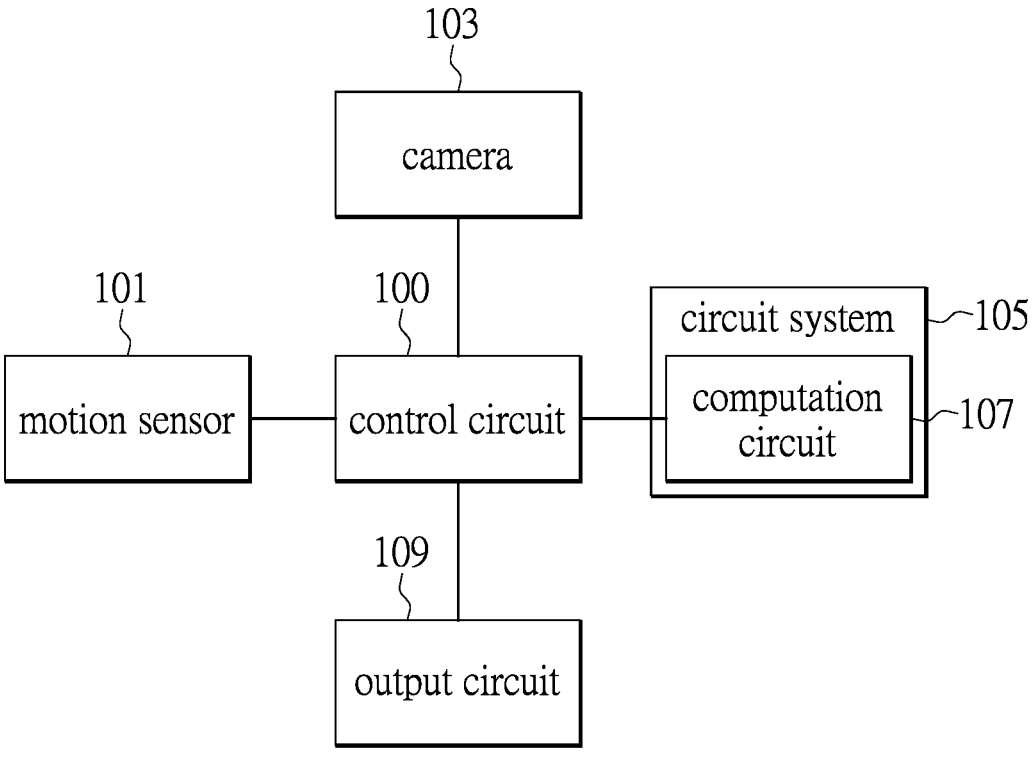
FIG. 1 is a schematic diagram showing an electronic system that operates a method for motion detection according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In order to overcome issues associated with a process of detecting a moving object through a conventional image-recognition technology (e.g., the conventional image-recognition technology having the problem of poor recognition performance if an object to be recognized occupies too few pixels in an image, and requiring an effective method for filtering out information that may result in misjudgment), the present disclosure provides a method for motion detection and a circuit system. In the method for motion detection and the circuit system provided by the present disclosure, since most camera devices available for performing surveillance are able to provide high resolution images and the size of these images is much larger than an image size required by an intelligent model operated in the circuit system, the images can be cropped to match the requirement of the intelligent model. Furthermore, in the method, a region of interest can be established according a movement event to be detected, and only the movement event in the region of interest is identified for improving the effect of motion detection.

The method for motion detection can be a software approach performed by the circuit system, and the circuit system can be a computer system or be implemented by an integrated circuit. The integrated circuit can be an application-specific integrated circuit (ASIC), a system on chip (SoC), or an integrated circuit that integrates many other circuits (e.g., an image signal processor (ISP), a communication circuit, an image encoder or decoder, and a neural network (NN) computation circuit).

Further, the circuit system can be applied to an electronic system that performs motion detection. The electronic system can be an access control system, a monitoring system or a relevant system that includes an electronic doorbell having a camera. In one embodiment of the present disclosure, reference is made to FIG. 1, which is a schematic diagram showing the electronic system that operates the method for motion detection according to one embodiment of the present disclosure. The electronic system includes a control circuit 100 that is used to control operations of electronic components of the circuit system. The control circuit 100 is electrically connected with other components (such as a motion sensor 101). The motion sensor 101 is a sensor that utilizes a light-sensing technology or other sensing technology. The motion sensor 101 can be an infrared sensor or a pyro-electric infrared detector (PIR). The electronic system includes a camera 103 that can take images of a scene in full time, or the camera 103 can be activated if any movement event in the scene is detected through the motion sensor 101. The movement event generally indicates sensing of a moving object. The activated camera 103 starts taking an image of the scene, and a picture is formed. The electronic system includes a circuit system 105 that is used to perform the method for motion detection. The control circuit 100 obtains the images taken by the camera 103. The circuit system 105 can process the images frame by frame, so as to detect the movement event in the image. A computation circuit 107 of the circuit system 105 can be activated to identify a human shape or a specific target through a neural network technology. Finally, the circuit system 105 confirms that the images have the moving object, and the movement event is then outputted via an output circuit 109.

Figure 2:
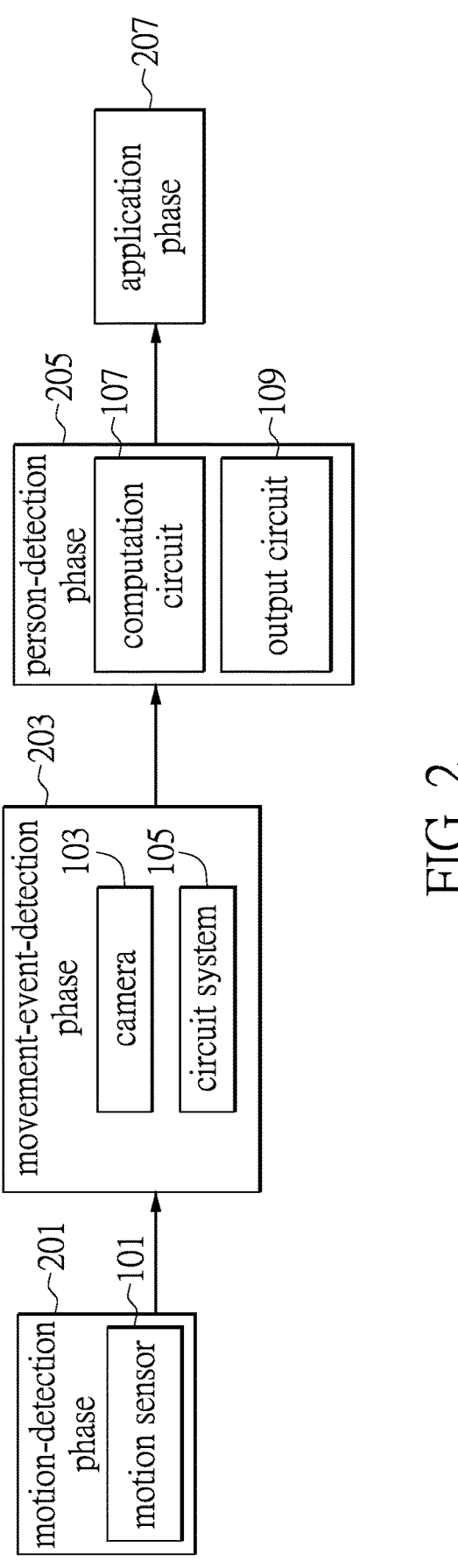
FIG. 2 is a schematic diagram showing different phases of operating the method for motion detection according to one embodiment of the present disclosure.

Based on the configuration of the above-mentioned circuit system, reference can be made to FIG. 2, which is a schematic diagram showing different phases (including a front-end motion-detection phase 201, a movement-event-detection phase 203, a person-detection phase 205 and an application phase 207) of operating the method for motion detection in the circuit system.

In the motion-detection phase 201, the motion sensor 101 is used to determine if any movement event occurs in the scene. If any movement event is detected, the circuit system enters the movement-event-detection phase 203. In the movement-event-detection phase 203, the camera 103 is activated to capture images of the scene. In the method for motion detection operated in the circuit system 105, an image-recognition technology is incorporated to detect the movement event. In one embodiment of the present disclosure, a background model is established from a series of continuous images. The subsequent images are compared with the background model, so as to identify a movement event according to changes of the images. The circuit system 105 implements an image signal processor (ISP) that can perform motion detection based on the continuous images collected through the camera 103.

If any movement event is identified from frame images, the moving object can then be recognized. Taking person detection as an example, the circuit system firstly enters the person-detection phase 205 and then utilizes the computation circuit 107 to inference human shape recognition model, so as to perform human shape recognition. A result of the human shape recognition is outputted to the application phase 207 via the output circuit 109. Then, the circuit system performs subsequent steps based on the result of human shape recognition. According to one embodiment of the present disclosure, in order to determine a human-shaped moving object, the human shape recognition model is applied to regions of interest in the multiple frame images obtained by the circuit system. The human shape recognition model is used to calculate a trust score for the human-shaped moving object being detected in each of the frame images. The trust score is compared with a determination threshold to confirm if any human-shaped moving object is detected.

According to the operations of the above-mentioned phases, when an electronic doorbell system having a camera is operated under the motion-detection phase 201, a motion sensor can be used to detect a movement event near a door in full time. If any movement event is identified, a control circuit of the electronic doorbell system is activated to perform the subsequent steps. After entering the movement-event-detection phase 203, the camera is activated to capture continuous images near the door. The circuit system performs the method for motion detection to identify the movement event. If any movement event is confirmed, the circuit system enters the person-detection phase 205 for recognizing a human shape in the images. When the human shape recognition model determines that there is no person entering the door, the movement event being identified this time can be ignored. Conversely, if any person is determined to enter the door, the electronic doorbell system is triggered under the application phase 207.

Figure 3:
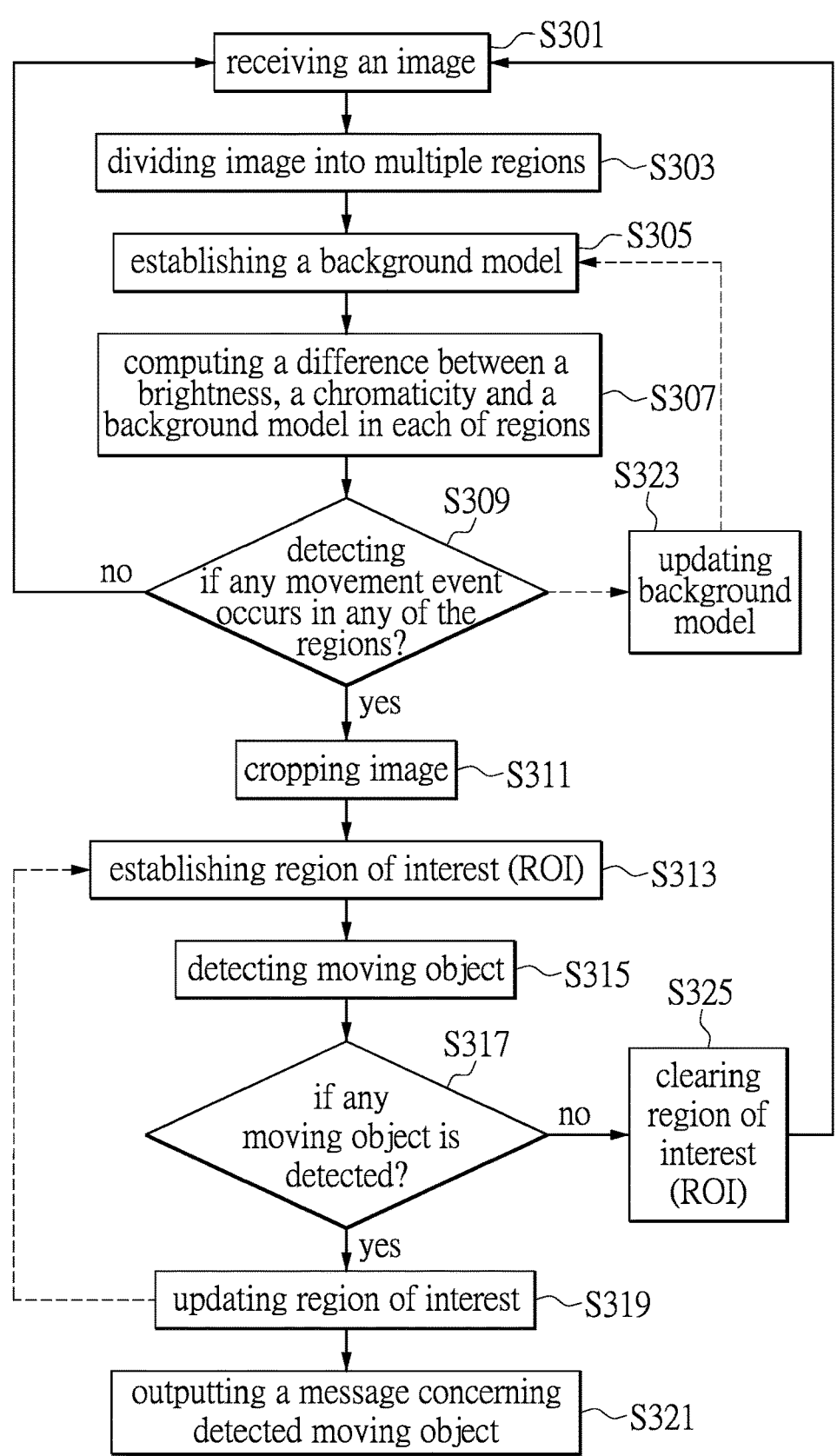
FIG. 3 is a flowchart of the method for motion detection according to one embodiment of the present disclosure.

Reference is made to FIG. 3, which is a flowchart of the method for motion detection according to one embodiment of the present disclosure.

The method for motion detection is operated in the above-described circuit system. In the beginning, an electronic system that performs the method captures a series of images of a scene. For example, a camera is activated to capture the images after a movement event is identified. In step S301, the circuit system receives continuous frame images, and these frame images can be processed frame by frame. In step S303, any of the frame images is divided into multiple regions. It should be noted that the size of the region may affect accuracy of recognition, and the size of the region can be decided depending on the computing capability of the circuit system. In step S305, a background model is established according to image features of consecutive ones of the frame images. The background model establishes static image features within the scene through a color graph, a grayscale graph or a binarized graph. The image features are, for example, brightness and chromaticity of the images. The background model corresponding to each of the regions is stored in an internal or an external memory of the circuit system. In addition to obtaining the initialized background model, the background model can also be updated based on a result of processing the subsequent images. Afterwards, based on the background model, a difference between the brightness and the chromaticity of each of the regions and the brightness and the chromaticity of the background model is calculated frame by frame in step S307. The difference is then compared with a threshold that is configured to confirm the movement event in the images. In step S309, the movement event can be identified in each of the regions.

If no movement event is detected in a specific frame or a certain number of continuous frames, the process returns to step S301 for repeating the above steps. The result of the motion detection can also be used to update the previous background model (step S323). Conversely, if any movement event is detected in one or more of the regions when being compared with the background model, the process proceeds to step S311, in which one or more of the frame images being detected to have the movement event is cropped based on one or more of the regions having the movement event. In other words, the regions being detected to have the movement event are dynamically cropped. Next, in step S313, a region of interest (ROI) is established according to one or more of the regions where the movement event is detected when the movement event is identified in any of the frame images. Furthermore, the ROI may also be updated according to the previous result of motion detection. The related records can be stored in a memory.

When the region of interest (ROI) is established, a neural network algorithm is used to recognize a moving object in the ROI in one or more of the frame images (step S315). The moving object can be, for example, a human-shaped object. The neural network algorithm is described below. It should be noted that, when the circuit system is in operation, the circuit inside the circuit system for performing the method is exemplified as the computation circuit 107 of FIG. 1. To achieve the purpose of power saving, the computation circuit 107 can be fully activated for performing the moving object detection and the human shape recognition after the ROI is established.

In step S317, whether or not any moving object is detected in the ROI is determined according to the result of motion detection. If there is no moving object to be detected, the records of the ROIs stored in the memory are cleared, and the process returns to step S301. On the other hand, if the moving object is detected, the process proceeds to a next step S319, and the position and the image features of the moving object can be accurately obtained. The ROI that is established based on the movement event detected in the previous step can be updated. For example, the regions covered by the ROI can be adjusted. Therefore, the moving object in the subsequent frame images can be detected according to the updated ROI. In an exemplary example, if a human shape is detected, the ROI should be updated given that the regions having the movement event will be changed as the person approaches the camera, moves away from the camera, or walks around a place. Next, information regarding detection of the moving object is outputted (step S321). After that, the other functions of the circuit system can continue, and the process of the motion detection returns to step S301.

Figure 4:
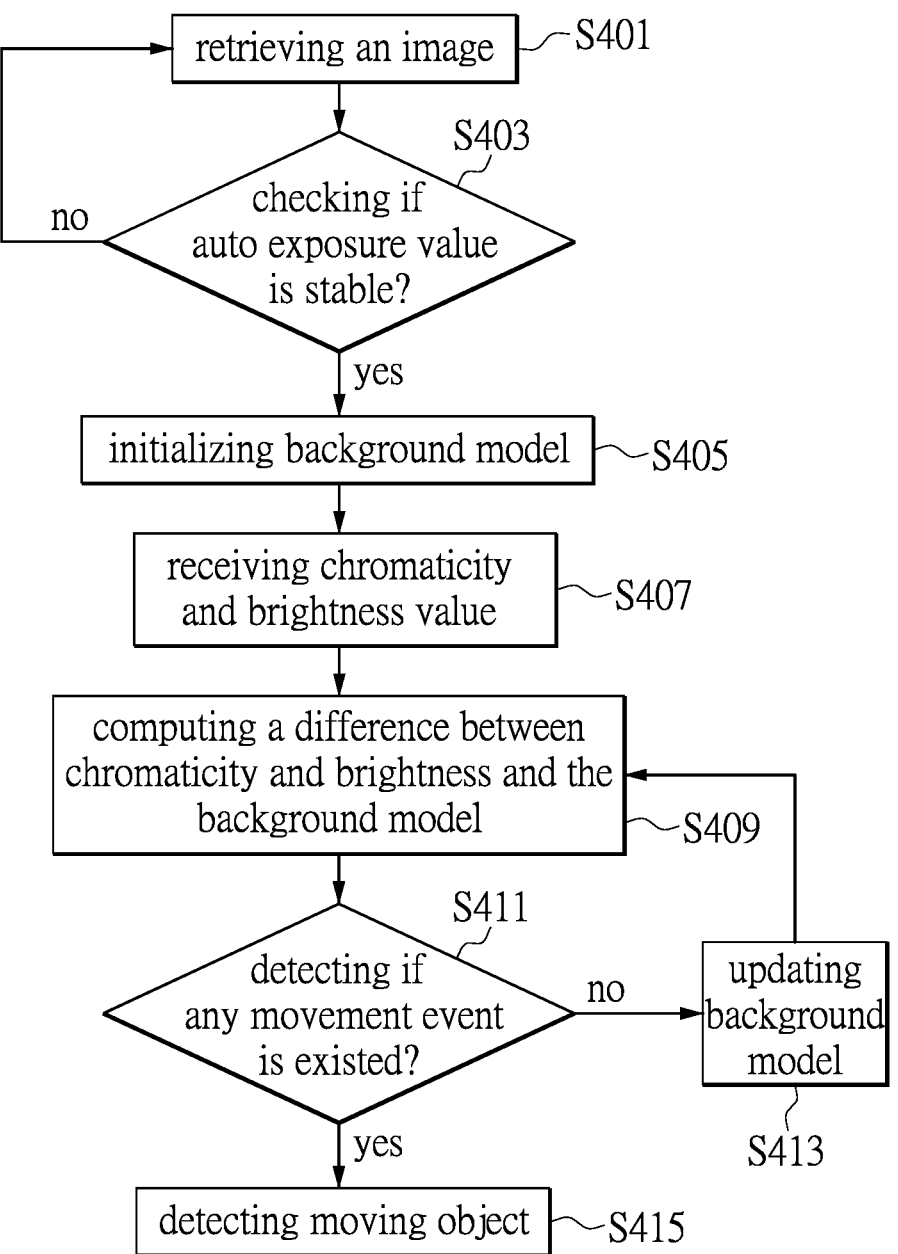
FIG. 4 is a flowchart illustrating a process of detecting a movement event according to one embodiment of the present disclosure.

The details of the step S309 of detecting the movement event in the images are as shown in FIG. 4 (which is a flowchart illustrating the method of motion detection).

Figure 5:
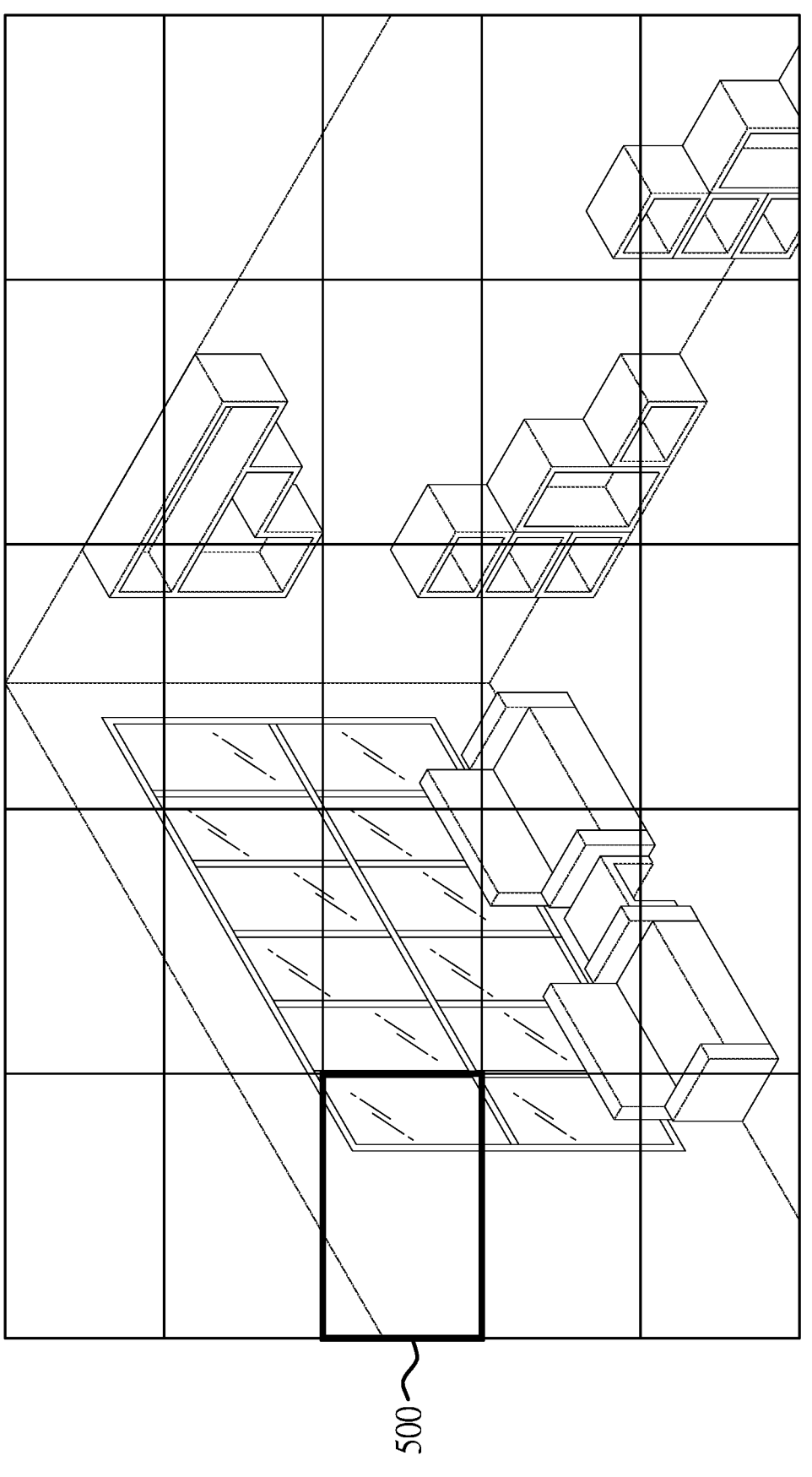
FIG. 5 is a schematic diagram showing a movement event being determined based on image information of each region after an image is divided according to one embodiment of the present disclosure.

When the continuous frame images captured by the camera are retrieved (step S401), whether or not an auto exposure (AE) value of each of the frame images is stable is first determined (step S403). If the AE value is not stable, the process returns to step S401 since the images with the stable AE values are required in the method for motion detection. When the images with the stable AE values are obtained, the images can be regarded as a background value of the scene. An image signal processor (ISP) that can be implemented by the circuit system of the present disclosure receives image values of specific sizes of the regions divided from the frame images. For example, as shown in FIG. 5, the image is divided into 5*5 regions which are represented by a region image 500. The ISP retrieves a value of chromaticity and brightness (e.g., YRGB) of the region image 500. In other words, once the AE values of the frame images are stable, the values of chromaticity and brightness of the frame images can be used to initialize the background model (step S405). The number or size of each of the regions affects the accuracy of image recognition. The smaller the region, the more precise the movement event can be detected. However, a computation amount will also increase along with the number of the regions.

For example, in FIG. 5, a frame is divided into 5*5 regions so as to form the region image 500. When the background model undergoes an initializing process, an average YRGB value of each of the regions (i.e., the region image 500) is calculated. Each of the regions can correspond to an average value of chromaticity and brightness (i.e., the average YRGB value). When the auto exposure value of the region image 500 is stable, the region image 500 can be regarded as a background without the movement event. In other words, the average YRGB value can be regarded as a background value of the region image 500. In this example, the whole frame image is divided into 25 regions that correspond to 25 average values of chromaticity and brightness, so as to render the background model.

After the background model is initialized, the value of chromaticity and brightness (i.e., the YRGB value) of each of the pixels of the current image can be retrieved (step S407). A difference between the value of chromaticity and brightness of each of the pixels and that of the background model is calculated (step S409), so as to detect whether or not the movement event has occurred (step S411). In one embodiment of the present disclosure, the difference between the value of chromaticity and brightness of the image and that of the background model is calculated, and the difference is compared with the average value of the whole image. The comparison of the differences for the whole image can be used to determine the movement event according to a threshold. This threshold is preset by the circuit system for determining the movement event.

In step S411, if no movement event is detected, the background model can be updated according to the result of no movement event in the above calculation (step S413), and the process returns to step S401. Conversely, if the movement event is detected, the next step is to establish the ROI for detecting a moving object corresponding to the movement event (step S415).

It should be noted that, when the circuit system obtains the value of chromaticity and brightness (e.g., 5*5 YRGB value) of each of the regions of the image, each value can correspond to an average value of each of the regions divided from the image. Accordingly, the effects that can be achieved include saving the computation amount, preserving data that reflect the color changes in the images, and filtering out small movement and movement that is relatively far away or relatively small.

In the above step of initializing or updating the background model, the value of the background model can be initialized from the obtained image data if the AE value of the image is stable. The background model can be represented by the value of chromaticity and brightness. One way of updating the background model is to calculate an average of the value of chromaticity and brightness in each of the frame images retrieved by the circuit system (i.e., BGmodel$_{current}$ in Equation 1) and the recorded value of chromaticity and brightness of the previous background model (i.e., BGmodel$_{previous}$ in Equation 1), or to use an specific ratio (Ratio1, Ratio2) for adjustment. The updated background model can be "BGmodel" in Equation 1. In this way, memory of the background can be increased, and sensitivity of movement detection can be improved. Further, the background model can be updated in real time, so that a false touch caused by the change of the background can be avoided.

$$BGmodel = \frac{Ratio1 * BGmodel_{current} + Ratio2 * BGmodel_{previous}}{Ratio1 + Ratio2} \quad \text{Equation 1}$$

After the background model is initialized or updated, the difference between each of the frame images and the background model is calculated. Specifically, the value of chromaticity and brightness of each of the frame images is obtained, and is used to compare with the value of chromaticity and brightness of the background model for calculating the difference. The circuit system relies on the difference to obtain movement information in the images. When the difference is larger than a preset threshold, a movement event is determined. A next step in the method is to detect a moving object. According to one embodiment of the present disclosure, the threshold may not be a fixed value, but can be adjusted by referring to an average difference of each of the frame images. It should be noted that noises or changes of light may cause a uniform difference for the whole image. For example, the auto exposure (AE) value and an auto white balance (AWB) may cause the image to have a uniform change, and the uniform change can also be filtered out by calculating the average difference of each of the frame images. Similarly, the region having a difference smaller than an average difference can also be filtered out. In normal conditions, there is no change of light and the average difference may approach zero, so that the threshold for motion detection is not affected. In an exemplary example, when a uniform change of brightness of the whole frame image is detected (e.g., turning on or off the light), the average difference of the frame image can be used to filter out this change that is regarded as noise.

Once the movement event is identified, the process enters a motion detection phase (as shown in step S415 of FIG. 4), such as a person-detection phase. In the motion detection phase, one or more of the regions where the movement event is identified (i.e., the difference of one or more of the regions being larger than the threshold) can be cropped. After that, the moving object can be recognized within the cropped image. According to one embodiment of the present disclosure, references are made to FIG. 6A to FIG. 6C, in which the image can be cropped to match the image size required by a model (e.g., the human shape recognition model).

Figures 6A, 6B, 6C:
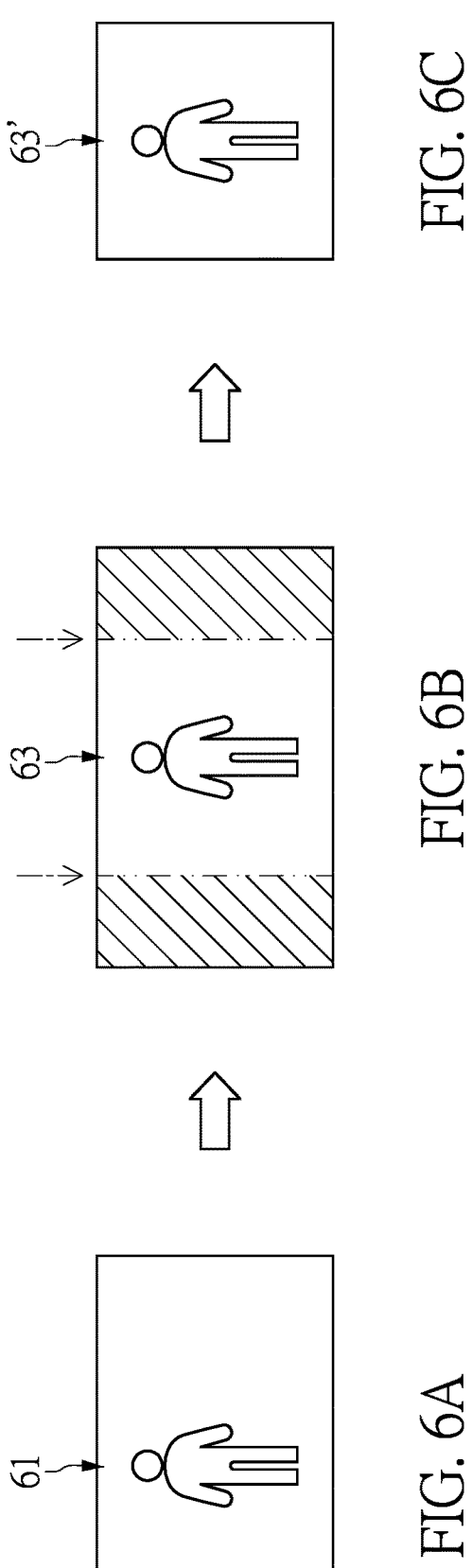
FIG. 6A to FIG. 6C are schematic diagrams showing a process of cropping the image to match an image size required by a model according to one embodiment of the present disclosure.

FIG. 6A shows an original image 61. When any movement event is detected in the original image 61, such as in FIG. 6B, a region image 63 having the movement event is obtained. After that, the original image 61 is cropped to obtain the region having the movement event. The schematic diagram of FIG. 6B shows that the image is to be cropped for obtaining a portion near the middle of the image. However, according to the movement event to be identified in the image in a practical operation, a portion of the image that is cropped can be a left side, a right side, or a specific position of the image. FIG. 6C is a schematic diagram showing a cropped image 63'. Thus, the frame image is cropped to fit the image size that is in accordance with the human shape recognition model, so as to avoid the problem of poor recognition caused by a distorted image. Further, after the image is cropped, the moving object can be recognized more easily since the moving object occupies a larger portion of the region(s) where the movement event is identified. Furthermore, a ratio of the frame image can also be adjusted to match the image size required by the model.

Moreover, when the determination threshold (i.e., a probability or a trust score) is used to determine that the moving object is detected in the images, the moving object should be detected in a limited number of continuous frame images. In the method for motion detection, a posture of the moving object can be determined. Taking a human shape recognition as an example, a neural network based human shape recognition model can be incorporated for calculating a trust score for each of the frame images having a human-shaped moving object. The trust score is used to compare with the determination threshold preset in the circuit system for confirming if any person is detected. If the person changes his posture, the human shape may not be identified since the trust scores with respect to some postures calculated in the human shape recognition model are lower than the determination threshold due to fluctuations found in the result of humanoid recognition. In view of above condition, the determination threshold can be dynamically adjusted. One of the objectives of dynamically adjusting the determination threshold is to make sure that there is a high probability for the person to be detected, regardless of the posture of the person or the change in size of the person in the image when the human-shaped moving object is identified.

In an exemplary example, when the posture of the moving object is changed (e.g., a front face of a person turning to a side face), the trust score of determining whether or not any moving object is present in the frame image calculated by the human shape recognition model may also change. When the trust score of the moving object in each of the frame images is calculated, the determination threshold can be dynamically adjusted for avoiding misjudgment and keeping track of the moving object in the images.

Figure 7:
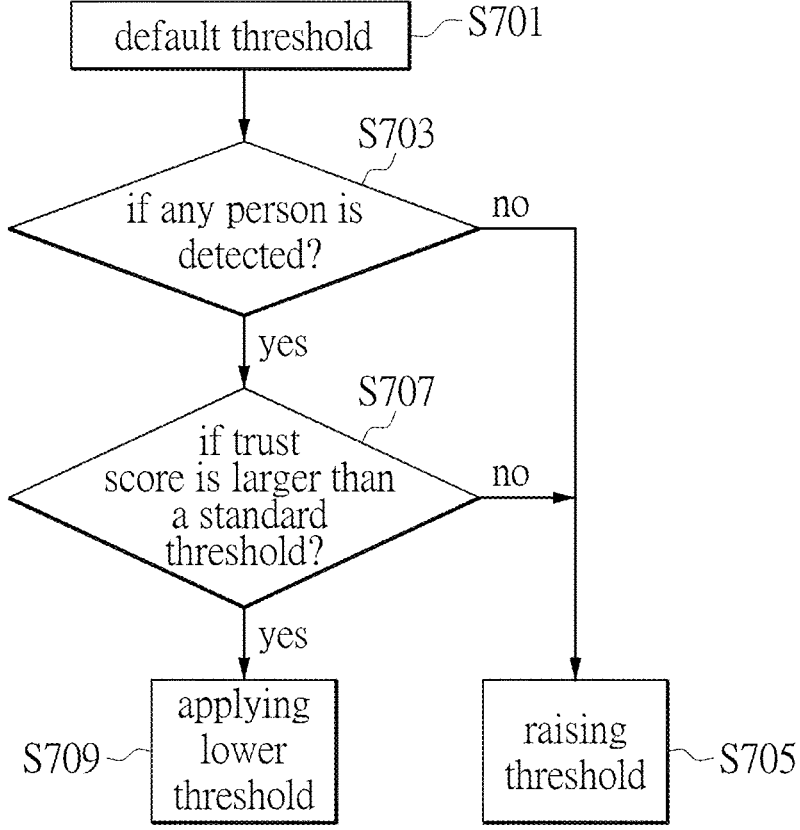
FIG. 7 is a flowchart illustrating a process of dynamically adjusting a determination threshold used in the method according to one embodiment of the present disclosure.

Reference is made to FIG. 7, which is a flowchart illustrating a process of dynamically adjusting the determination threshold. In an algorithm for human shape recognition, a default threshold is set. Initially, the default threshold (e.g., threshold=0.6) is used to determine if any person is present in a scene. Afterwards, the determination threshold can be adjusted according to the result of motion detection. That is, the trust score for detecting the person in the scene is referred to for calculating a degree of relaxation for a next determination threshold. Further, a standard threshold is also set as a lower limit, so as to avoid too many misjudgments due to the determination threshold being too low. It should be noted that the mechanism for adjusting the determination threshold is that if the trust score being calculated by the intelligent human shape recognition model for detecting the human-shaped moving object is high, the human-shaped moving object is detected and will last for a period of time, so that the moving object may still be present in a next frame image. At the same time, the determination threshold can be lowered to prevent filtering out the images that should have the human-shaped moving object through a high threshold.

In one embodiment of the present disclosure, the threshold used for determining the human-shaped moving object can be adjusted and expressed in Equation 2. According to Equation 2, a current threshold ($threshold_{current}$) used for human shape recognition is equal to the square of a difference between the standard threshold ($threshold_{standard}$) and the trust score for the human shape that is detected previously ($trustscore_{previous}$) being subtracted from the previous threshold ($threshold_{previous}$).

$$threshold_{current} = threshold_{previous} - (trustscore_{previous} - threshold_{standard})^2. \qquad \text{Equation 2}$$

In the flowchart of FIG. 7, the neural network algorithm is applied for performing the human shape recognition, which includes calculating the trust score of a human shape to be detected in the image. A mechanism of dynamically adjusting the threshold is provided. In the beginning, the default threshold is used (step S701). The human shape recognition model is used to acquire the trust score for any person to be detected in each of the frame images. The trust score of each of the frame images is compared with the default threshold for confirming if any human-shaped moving object is detected (step S703). More particularly, in the process of performing the human shape recognition based on the trust score, the threshold is adjusted depending on whether or not any person is detected. Not detecting any person (no) means that there is no person in the continuous images. In order to avoid false action, the threshold will be raised under this situation (step S705).

Conversely, if a comparison result between the trust score and the determination threshold indicates that a person is detected, the determination threshold is adjusted to a lower value under the mechanism of dynamically adjusting the threshold, so as to ensure that the person can be detected in the next frame image. Referring to Equation 2, the process proceeds to step S707 for comparing the trust score with the standard threshold. If the trust score does not exceed the standard threshold, the threshold is raised for the purpose of preventing false action (step S705). However, if the trust score exceeds or is equal to the standard threshold, the standard threshold is used (step S709).

According to one embodiment of the method for motion detection of the present disclosure, if any person is detected, the threshold for evaluating the trust score can be relaxed since there is difficulty in guaranteeing that every action or size of the person can be detected with a higher trust score when the person is in movement. A lower determination threshold allows the circuit system to detect the human shape in the continuous images, so that the human-shaped moving object can be tracked continuously. Conversely, if there is no person to be detected, the determination threshold can be raised for preventing misjudgment.

According to one further embodiment of the method for motion detection of the present disclosure, in the process of detecting the moving object, the trust score to be calculated may be changed if the detected moving object moves away from or approaches the camera. Or, the trust score can also be affected by a proportion of the moving object in the image. Therefore, through the mechanism of dynamically adjusting the threshold, the moving object can be prevented from being determined to disappear due to the change in size of the moving object in the image, and the moving object can still be tracked continuously.

In summation, if the factor of power saving is not considered, the motion detection process can continue even if there is no movement event to be detected. More particularly, in the method for motion detection of the present disclosure, when there is no movement event to be detected, the motion detection is still performed on the regions where the movement event is previously detected. Taking the human shape recognition as an example, a person that is still in the image or a person leaving through a passage or an entrance (where people are most likely to be detected) may cause the movement event to disappear in the regions. Therefore, in the method for motion detection, in order to avoid any false action caused by an object that remains still, the threshold should be raised when there is no motion detected. It can effectively filter out the background which does not need to be processed and improve the accuracy for determining whether or not any person or specific object is present in the regions.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for motion detection, which is operated in a circuit system, comprising:
    retrieving continuous frame images of a scene;
    identifying a movement event in each of the frame images, wherein each of the frame images is divided into multiple regions, and a difference between brightness and chromaticity values of each of the regions and brightness and chromaticity values of a background model is calculated frame by frame for identifying the movement event;
    establishing, according to one or more of the regions where the movement event is detected, a region of interest when the movement event is identified in any of the frame images; and
    using a human shape recognition model to detect a human-shaped moving object with respect to the region of interest in one or more of the frame images, wherein the human shape recognition model that performs human shape recognition calculates a trust score for the human-shaped moving object being detected in each of the frame images, and the human shape recognition model detects the human-shaped moving object when the trust score is larger than a determination threshold; wherein the determination threshold is configured to be lowered when the human-shaped moving object is detected, so as to prevent images that are to contain the human-shaped moving object from being filtered out due to a high threshold;
    wherein, in response to the human-shaped moving object being detected, the region of interest is updated according to a position and image features of the human-shaped moving object, so as to detect the human-shaped moving object based on the updated region of interest in the subsequent frame images; wherein, in response to the human-shaped moving object not being detected, records of the region of interest stored in a memory are deleted.

2. The method according to claim 1, wherein the circuit system is implemented by an integrated circuit and includes a computation circuit; wherein, when an electronic system including the circuit system senses the movement event in the scene by using a motion sensor, a camera of the electronic system is activated to capture the continuous frame images in the scene.

3. The method according to claim 2, wherein, when the movement event is identified, the computation circuit of the circuit system is activated to perform a process of detecting the human-shaped moving object in each of the frame images.

4. The method according to claim 3, wherein the computation circuit operates a neural network algorithm by inferencing the human shape recognition model.

5. The method according to claim 4, further comprising:
cropping one or more of the frame images to match an image size required by the human shape recognition model, or adjusting a ratio of each of the frame images to fit the image size required by the human shape recognition model.

6. The method according to claim 1, wherein, in the step of identifying the movement event, whether or not an auto exposure value of each of the frame images is stable is first determined when the continuous frame images are obtained; wherein, in response to the auto exposure value being unstable, the frame images with the stable auto exposure values are further required; wherein, in response to the auto exposure value being stable, the background model is initialized according to brightness and chromaticity values of each of the frame images.

7. The method according to claim 1, wherein, in the step of identifying the movement event in each of the frame images in a frame-by-frame manner, each of the frame images is divided into the multiple regions, and image features including the brightness and chromaticity values of each of the regions are obtained; wherein the background model is established according to brightness and chromaticity values of consecutive frame images, and then the difference between the brightness and the chromaticity value of each of the regions and the brightness and the chromaticity values of the background model is calculated frame by frame and compared with a threshold, so as to confirm the movement event.

8. The method according to claim 7, wherein the background model is expressed by brightness and chromaticity values; wherein, in a process of updating the background model, an average of the value of chromaticity and brightness of the current frame image and the value of chromaticity and brightness of the background model is calculated, so as to obtain the updated background model.

9. The method according to claim 8, wherein, in the step of identifying the movement event, whether or not an auto exposure value of each of the frame images is stable is first determined when the continuous frame images are obtained; wherein, in response to the auto exposure value being unstable, the frame images with the stable auto exposure values are further required; wherein, in response to the auto exposure value being stable, the background model is initialized according to brightness and chromaticity values of each of the frame images.

10. A circuit system, characterized in that the circuit system is applied to an electronic system, and the circuit system performs a method for motion detection after receiving continuous frame images of a scene through a camera of the electronic system, the method for motion detection including:

retrieving the continuous frame images;

identifying a movement event in each of the frame images, wherein each of the frame images is divided into multiple regions, and a difference between brightness and chromaticity values of each of the regions and a background model is frame-by-frame calculated for identifying the movement event;

establishing, according to one or more of the regions where the movement event is detected, a region of interest when the movement event is identified in any of the frame images; and using a human shape recognition model to detect a human-shaped moving object with respect to the region of interest in the one or more of the frame images, wherein the human shape recognition model that performs human shape recognition calculates a trust score for the human-shaped moving object being detected in each of the frame images, and the human shape recognition model detects the human-shaped moving object when the trust score is larger than a determination threshold; wherein the determination threshold is configured to be lowered when the human-shaped moving object is detected, so as to prevent images that are to contain the human-shaped moving object from being filtered out due to a high threshold;

wherein, in response to the human-shaped moving object being detected, the region of interest is updated according to a position and image features of the human-shaped moving object, so as to detect the human-shaped moving object based on the updated region of interest in the subsequent frame images; wherein, in response to the human-shaped moving object being detected, records of the region of interest stored in a memory are deleted.

11. The circuit system according to claim 10, wherein the circuit system is implemented by an integrated circuit and includes a computation circuit; wherein the circuit system is applied to the electronic system that includes a motion sensor, the camera and an output circuit.

12. The circuit system according to claim 11, wherein, when the electronic system senses the movement event in the scene by using the motion sensor, the camera is activated to capture the continuous frame images in the scene.

13. The circuit system according to claim 12, wherein, in the method for motion detection, when the movement event is identified, the computation circuit of the circuit system is activated to perform a process of detecting the human-shaped moving object in each of the frame images.

14. The circuit system according to claim 13, wherein the computation circuit operates a neural network algorithm for inferencing the human shape recognition model.

15. The circuit system according to claim 10, wherein, in the step of identifying the movement event, whether or not an auto exposure value of each of the frame images is stable is first determined when the continuous frame images are obtained; wherein, in response to the auto exposure value being unstable, the frame images with the stable auto exposure values are further required; wherein, in response to the auto exposure value being stable, the background model is initialized according to brightness and chromaticity values of each of the frame images.

16. The circuit system according to claim 10, wherein, in the step of identifying the movement event in each of the frame images in a frame-by-frame manner, each of the frame images is divided into the multiple regions, and image features including the brightness and chromaticity values of each of the regions are obtained; wherein the background model is established according to brightness and chromaticity values of consecutive frame images, and then the difference between the brightness and the chromaticity values of each of the regions and the brightness and chromaticity values of the background model is calculated frame by frame and compared with a threshold so as to confirm the movement event.

17. The circuit system according to claim 16, wherein, in the step of identifying the movement event, whether or not an auto exposure value of each of the frame images is stable is first determined when the continuous frame images are obtained; wherein, in response to the auto exposure value being unstable, the frame images with the stable auto exposure values are further required; wherein, in response to the auto exposure value being stable, the background model is initialized according to brightness and chromaticity values of each of the frame images.

* * * * *